Nov. 13, 1962 — R. L. ENSINGER — 3,063,305
REMOTE CONTROL STRUCTURE
Filed Jan. 14, 1959
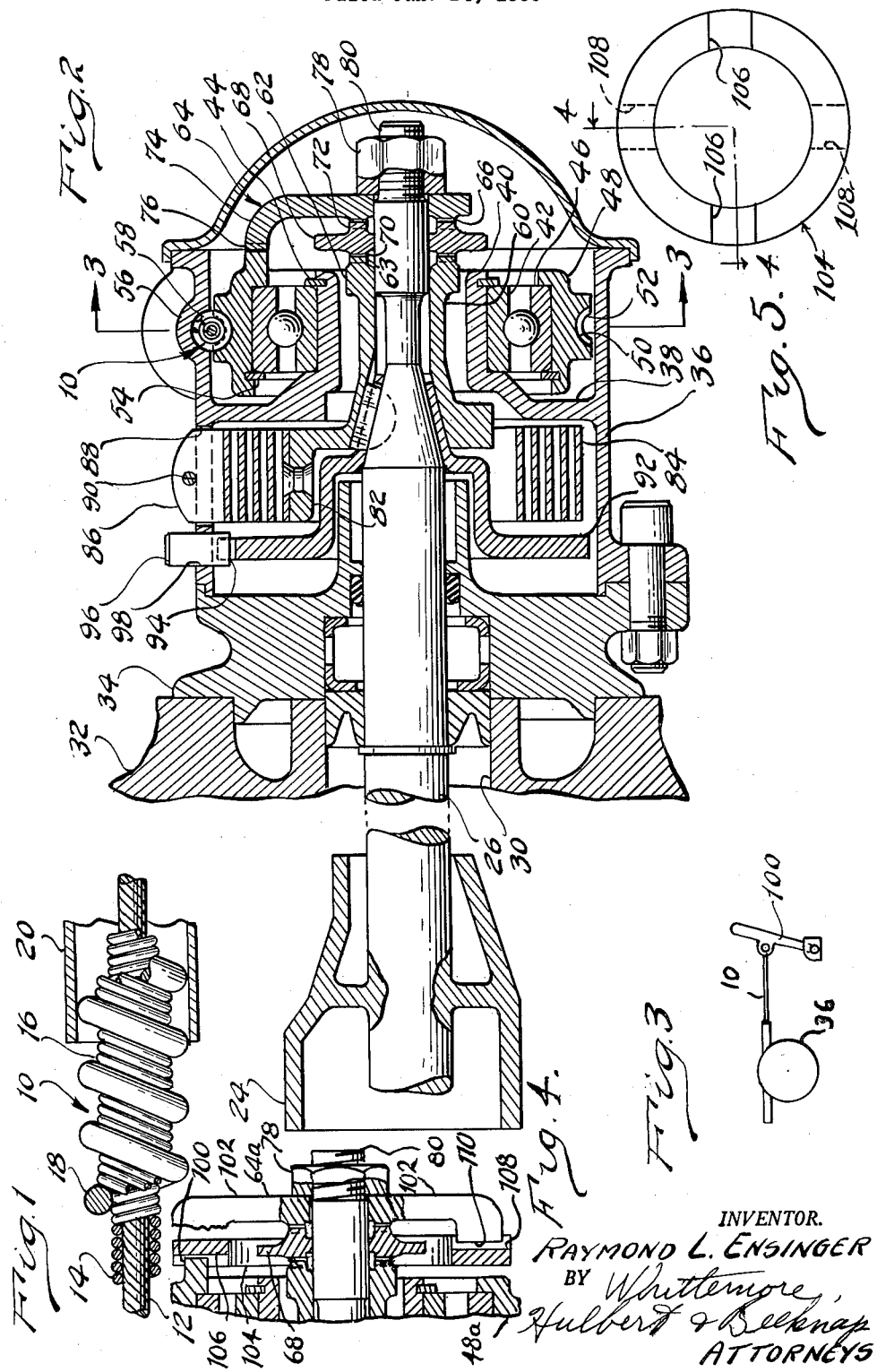
INVENTOR.
RAYMOND L. ENSINGER
BY Whittemore,
Hulbert & Belknap
ATTORNEYS United States Patent Office 3,063,305
Patented Nov. 13, 1962

3,063,305
REMOTE CONTROL STRUCTURE
Raymond L. Ensinger, Detroit, Mich., assignor to Holley Carburetor Company, Van Dyke, Mich., a corporation of Michigan
Filed Jan. 14, 1959, Ser. No. 786,870
12 Claims. (Cl. 74—568)

The present invention relates to remote control structure, and more particularly to such structure comprising a movable control member, a movable adjusting member, and actuating means connecting said members in which the actuating means includes releasable and selectively engageable means for adjusting the relationship between said members.

More particularly, it is an object of the present invention to provide in apparatus of the type described actuating means including an elongated preferably flexible toothed element in meshed tangential engagement with a peripherally toothed rotary element for producing rotation of said rotary element upon longitudinal movement of said elongated element.

It is a further object of the present invention to provide means for selectively adjusting the timed relationship between a pair of interconnected movable members which comprises an elongated flexible toothed element in mesh with a peripherally toothed rotary element, an adjusting member for effecting longitudinal movement of said elongated element, and selectively adjustable coupling means for connecting said rotary element to a rotatable control element.

Other objects and features of the invention will become apparent as the description proceeds, especially when taken in conjunction with the accompanying drawing, illustrating preferred embodiments of the invention, wherein:

FIGURE 1 is a fragmentary elevational view with parts broken away of an elongated flexible toothed connecting element.

FIGURE 2 is a longitudinal sectional view through structure made in accordance with the present invention.

FIGURE 3 is a sectional view on the line 3—3, FIGURE 2.

FIGURE 4 is a fragmentary sectional view taken on radial lines separated 90 degrees apart and showing a modified coupling connection.

FIGURE 5 is an elevational view of the coupling element used in the construction shown in FIGURE 4.

There are many instances where it is required to provide for remote accurate adjustment of a movable control member such for example as a cam, and at the same time to effect such adjustment by appropriate movement of a movable adjusting member. A further requirement is that the position of the movable adjusting member shall be a true and accurate indication of the instantaneous position of the adjustable control member. Adjustment of aircraft controls such for example as adjustment of control instrumentalities associated with the power plant, from the pilot's position is an excellent example of the foregoing.

Several types of devices for effecting a remote adjustment of such control devices are available and one which is commonly employed includes an elongated flexible toothed element such as indicated at 10 in FIGURE 1. This elongated element, as well illustrated in the figure, comprises a wire core 12 wound with an inner helical wire wrapping 14 and oppositely extending outer wire wrapping 16. Extending around the outer wire 16 is a relatively heavy wire wrapping 18 adjacent convolutions of which are spaced to provide the equivalent of a single continuous helical tooth thereon. It will be apparent from the figure that the wire 18 is generally equivalent to the tooth of a worm.

The foregoing structure is available on the market under the trade name "Teleflex" cable and it may be employed alone as a tension element, or it may be associated with a sheath 20 which closely envelops the convolutions of the helical thread or wire 18. In the latter case it will be appreciated that the flexible elongated element 10 may be employed as a push-pull type connector if the ends of the sheath 20 are properly supported. In this case the flexible toothed element 10 is preferably provided with straight elongated rigid portions at the opposite ends extending into the adjacent ends of the sheath and adapted to be connected to the members which are interconnected by the structure.

In employing a flexible connector of the type described a problem has been presented in accommodating the flexible connector between separated stations, in which the distance between the stations does not necessarily coincide with the length of cable provided. In any case where accurate correlation between the adjusted positions of the control member and adjusting member is required, means must be provided to enable the members to be relatively adjusted so that the instantaneous position of the adjusting member not only determines the position of the control member but also serves as an indication of the position of the control member.

Prior to the present invention it has been common practice to cut the flexible cable and to splice the ends together with suitable clamping means so that the length of cable may be adjusted to the distance separating the adjusting and control members. This obviously is a crude method of effecting the required adjustment and moreover, is undesirable since it provides two areas of weakness in the cable subject to failure in use.

In accordance with the present invention and as best illustrated in FIGURES 2 and 3, the problem is to effect rotary or angular adjustment of a control member such as a control cam 24 which is formed on or rigidly connected to a shaft 26. The shaft 26 is rotatable in an opening 30 provided in a frame 32 and extends outwardly through the opening. Suitably supported on the frame is an annular adapter 34 on which is mounted a generally tubular housing 36. The housing is provided with an annular web 38 terminating in a tubular bearing support 40 on which is mounted the inner race 42 of a bearing. The inner race is retained in position by a spring clip 44. Connected to the outer race 46 of the bearing is a rotary element 48 having an annular recess 50 of generally semi-circular cross-section provided at its interior with helically extending teeth 52 conjugate to the single continuous tooth 18 of the elongated flexible element 10. The rotary element 48 is retained in assembly with the outer race 46 of the bearing by a spring clip 54.

The housing 36 is provided with a straight elongated guideway 56, the intermediate portion of which is cut away to leave an inwardly facing channel of generally semi-circular cross-section, as indicated at 58 in FIGURE 2. The annular peripheral groove or channel 50 on the element 48 cooperates with the cut away portion of the passage to provide a substantially continuous guideway of circular cross-section extending completely through the housing 36. The flexible elongated toothed element 10 extends through this guideway and is of course retained in tight mesh with the toothed peripheral portion thereof, as best illustrated at the top of FIGURE 2. Accordingly, longitudinal movement of the elongated toothed element through the guideway results in corresponding positive rotation of the rotatable toothed element 48.

Keyed or otherwise fixedly secured on a portion of the shaft 26 within the housing 36 is a torque transmitting sleeve 60 having a thickened flange 62 at its outer end, the end surface of the flange being provided with a circular array of teeth 63 which surround the adjacent reduced portion of the shaft 26. Slidable longitudinally on the shaft 26 is a driving dog 64 having at its inner surface an annular array of teeth 66 surrounding the shaft 26 and in confronting but spaced relation to the teeth 63 of the sleeve 60. Interposed between the teeth 63 and 66 is an annular coupling connector 68 having at its inner side an annular series of teeth 70 equal in number and shape to interfit with the teeth 63 on the sleeve 60. At its outer side the coupling connector 68 is provided with an annular array of teeth 72 equal in number and adapted to interfit with the teeth 66 on the dog 64. The dog 64 includes a radial extension 74 having teeth adapted to interfit with correspondingly shaped teeth on the rotatable element 48 as indicated at 76. The dog 64 is urged to the left as seen in FIGURE 2 by a nut 78 received on the threaded end portion 80 of the shaft. The nut 78 causes the teeth 63 and 70 to be firmly engaged and also causes the teeth 66 and 72 to be firmly engaged, thus establishing a positive driving connection between the rotary element 48 and the torque transmitting sleeve 60. Since the sleeve 60 is keyed to the shaft 26 this results in effecting a positive drive connection to the shaft 26.

The number of teeth 63 and 70 differs slightly from the number of teeth 66 and 72. For example, one of the groups of teeth may be 36 in number and the other group of teeth 35 in number. With this arrangement it will be apparent that a positive driving connection between the shaft 26 and the rotary element 48 may be established at increments of approximately 17 minutes of arc. In other words, for practical purposes the positive driving connection established by the dog 64 and the coupling connector 68 may be considered as providing for substantially continuous angular adjustment between the parts.

The sleeve 60 includes an extension 82 on which is secured the inner end of a coil spring 84, the outer end of which is turned outwardly as indicated at 86 and extends through a slot 88 in the housing 36 and is retained in the slot by suitable means such as a cotter pin indicated at 90.

Also secured to the shaft 26 is a locating plate 92 having a recess 94 formed in its periphery and adapted to receive a removable locating or rigging pin 96 which extends through a locating opening 98. The housing 36 and adapter 34 are connected to the frame 32 in properly indexed position so that the position of the locating opening 98 is predetermined with respect to the angular position of the cam 24. Accordingly, when the locating pin 96 is inserted through the opening 98 into the recess 94 the cam 24 occupies a prefectly definitely known position which may be a limiting position of the cam or any intermediate position thereof as desired.

In order to adjust the mechanism for proper operation the movable adjusting member which is diagrammatically indicated in FIGURE 3 as a lever or handle 100, is placed in the position corresponding to the locked position of the cam 24. The cable 10 is introduced into the housing 36, the driving dog 64 having been disengaged by loosening the nut 78. Insertion of the cable 10 through the guideway results in free rotation of the rotatable element 48 and the cable may be drawn through the housing 36 to remove all slack from the cable and to establish a predetermined tension thereon. With the parts retained in this relationship the coupling connector 68 is rotated to the proper position to permit locking the driving dog 64 and the torque transmitting sleeve together without relative angular movement therebetween, after which the nut 78 is tightened. This results in providing a positive driving or actuating connection between the movable adjusting member such as the handle 100 and the movable control member such as the cam 24, while all slack has been taken out of the flexible connecting cable. Removal of the pin 96 frees the shaft 26 for rotation and it may be rotated in one direction by a pull on the cable 10. The spring 84 is effective to rotate the shaft 26 in the opposite direction to the extent permitted by the cable 10.

It will be appreciated that the construction as thus described does not require the cable 10 to have the sheath 20 thereover although it may be provided if desired. On the other hand, if the sheath is provided, reverse rotation of the shaft 26 may be controlled by a push-pull operation of the flexible cable. In any case, the use of the spring 84 is not essential.

While the torque transmitting sleeve 60 is shown as directly connected to the control device so that rotation of the sleeve results in rotation of the control device, it will of course be appreciated that the sleeve 60 may effect any desired movement to a control device. Thus for example, the control device may be mounted for rectilinear reciprocation and may be connected to the sleeve 60 by a rack and pinion connection, suitable linkage, or the like.

Similarly, while for purposes of illustration, the movable adjusting member which is manipulated by the operator has been illustrated as a swinging handle or lever, it will of course be appreciated that specifically different devices under the control of the operator may be provided for imparting longitudinal movement to the elongated flexible control element. Thus for example, a threaded rotatable element may be provided and connected to the elongated element so that rotation thereof imparts longitudinal movement to the elongated toothed element.

For effecting extremely accurate agreement between the positions of the control member and the movable adjusting member the nut 78 may be loosened while the toothed portions of the dog 64 and rotatable element indicated at 76 are held in firm engagement. At this time the toothed portions 63, 66, 70 and 72 may be held in light engagement. With the parts so disposed the coupling connector 68 may be rotated to the right or left a predetermined number of "clicks" each click indicating an angular adjustment of approximately 17 degrees of arc which will be effective when the nut 78 is tightened to draw the parts into firm intermeshed relationship.

While the foregoing construction operates entirely satisfactorily in most cases, in some cases, particularly where relatively larger forces are employed, a second embodiment of the invention is preferred. In the embodiment of the invention so far described it of course is apparent that torque is applied to the shaft 26 through a single arm 64 extending laterally from one side of the shaft. Where the cable 10 has to exert large forces on the pulley this creates an undesirable moment about the axis of the shaft 26 which in turn tends to cock the shaft so as to cause undue localized stresses in the various bushing members. This undesirable result is completely avoided by the modification of the structure illustrated in FIGURES 4 and 5.

In these figures unmodified parts are identified by the same reference characters as in FIGURE 2, and new reference characters are applied only to the modified elements.

In this construction the rotatable element is designated 48a and differs from the rotatable element 48 only in that it is provided with a pair of axially extending driving elements 100 located diametrically opposite each other on the edge of the rotatable member 48a. In FIGURE 4 only one of these driving projections is visible since the sectional view of this figure is taken on two radial planes separated by 90 degrees, such for example as the planes designated at 4—4 in FIGURE 5. Instead of the driving dog 64 shown in FIGURE 2 which has a single laterally extending arm, a driving dog 64a is employed having a pair of diametrically oppositely extending arms 102.

Interposed between the dog 64a and the rotatable member 48a is an annular coupling member 104 details of which are best seen in FIGURE 5. The coupling member is in the form of an annular body having at one side thereof a pair of aligned radially extending slots 106 located at one side of the member, and a second pair of aligned radially extending slots 108 at the opposite side of the member. One set of slots, as for example the slots 106, will receive the diametrically located projections 100 of the rotatable member 48a. The second pair of slots 108 receives projections 110 at the ends of the arms 102 of the dog 64a. The coupling connector 68 is employed as before and includes the differential teeth as described in conjunction with the first embodiment of the invention.

With this arrangement it will of course be apparent that the torque is transmitted through the coupling member 104 uniformly to diametrically opposite points at the ends of the driving dog 64a. Moreover, the coupling member 104, since its connection between the rotatable member 48a and the driving dog 64a is by pairs of slots, centers itself and floats to correct operating position.

While the coupling member is shown as in the form of a ring having slots disposed at opposite sides thereof, it will of course be apparent that if preferred the slots could be provided in the edge of the rotatable member 48a and projections provided on the coupling member and a similar reversal of connecting portions provided at the opposite side of the connecting member for cooperation between the connecting member and the driving dog 64a.

The drawing and the foregoing specification constitute a description of the improved remote control structure in such full, clear, concise and exact terms as to enable any person skilled in the art to practice the invention, the scope of which is indicated by the appended claims.

What I claim as my invention is:

1. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated toothed member extending through said guideway and in mesh with said first rotary element and movable longitudinally in said guideway in response to movement of said adjusting member, a second rotary element coaxial with said first rotary element, an adjustable toothed coupling device connecting said rotary elements effective to establish a positive drive connection between said rotary elements while said adjusting member is in a known position corresponding to the known position of said control member.

2. Remote adjusting mechanism for a rotary member having a shaft, a peripherally toothed annular element mounted for rotation on said shaft, a fixed housing enclosing said element and defining an elongated guideway extending tangentially of said element, an elongated toothed element in said guideway and in mesh with said annular element and extending to a point remote from said housing for actuation thereat and movable longitudinally in said guideway to rotate said annular element, a driving element releasably carried by said shaft, means for clamping said driving element in coupling relation between said shaft and annular element with said annular element in any selected angular relationship to said shaft and a removable locator engageable between said housing and said shaft to fix said shaft in a reference position corresponding to a known position of said rotary member.

3. Remote adjusting mechanism for a rotary member having a shaft, a peripherally toothed annular element mounted for rotation on said shaft, a fixed housing enclosing said element and defining an elongated guideway extending tangentially of said element, an elongated flexible toothed element in said guideway and in mesh with said annular element and extending to a point remote from said housing for actuation thereat and movable longitudinally in said guideway to rotate said annular element, a driving element releasably carried by said shaft, means for clamping said driving element in coupling relation between said shaft and annular element with said annular element in any selected angular relationship to said shaft, and a removable locator engageable between said housing and said shaft to fix said shaft in a reference position corresponding to a known position of said rotary member and resilient means in said housing and connecting said housing and shaft and operable to bias said shaft in a direction to tension said elongated element between the remote point and said housing.

4. Remote adjusting mechanism for a rotary member having a shaft, a peripherally toothed annular element mounted for rotation on said shaft, a fixed housing enclosing said element and defining an elongated guideway extending tangentially of said element, an elongated flexible toothed element in said guideway and in mesh with said annular element and extending to a point remote from said housing for actuation thereat and movable longitudinally in said guideway to rotate said annular element, a driving element releasably carried by said shaft, means for clamping said driving element in coupling relation between said shaft and annular element with said annular element in any selected angular relationship to said shaft, and a removable locator engageable between said housing and said shaft to said shaft in a reference position corresponding to a known position of said rotary member and resilient means in said housing and connecting said housing and shaft and operable to bias said shaft in a direction to tension said elongated element between the remote point and said housing, the means for clamping said driving element in coupling relation between said shaft and said annular element comprising means fixed on said shaft provided with an annular toothed surface, said driving element having an annular toothed surface confronting the first mentioned annular toothed surface, an annular coupling member interposed between said annular toothed surfaces and having on its opposite sides teeth equal in number and shaped to interfit with the teeth on said annular toothed surfaces, the number of teeth on said annular toothed surfaces being slightly different.

5. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated toothed member extending through said guideway and in mesh with said first rotary element and movable longitudinally in said guideway in response to movement of said adjusting member, a second rotary element coaxial with said first rotary element, oppositely facing annular toothed surfaces on said rotary elements, and an adjustable toothed coupling device connecting said rotary elements effective to establish a positive drive connection between said rotary elements while said adjusting member is in a known position corresponding to the known position of said control member, said coupling device having on its opposite sides teeth equal in number and shaped to interfit with the teeth on said annular toothed surfaces.

6. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated toothed member extending through said guideway and in mesh with said first rotary element and movable longitudinally in said guideway in response to movement of said adjusting member, a second rotary element coaxial with said first rotary element, an adjustable toothed coupling device connecting said rotary elements effective to establish a positive drive connection between said rotary elements while said adjusting member is in a known position corresponding to the known position of said control member, and resilient means in said housing and connected between said housing and said rotary elements and effective to bias said rotary elements in a direction to tension said elongated toothed member.

7. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated flexible toothed member extending through said guideway and in mesh with said first rotary element and movable longitudinally in said guideway in response to movement of said adjusting member, a flexible tubular sheath surrounding said elongated element and having one end anchored to said housing and confining said elongated element to provide for push-pull actuation of said control member through said elongated element, a second rotary element coaxial with said first rotary element, an adjustable toothed coupling device connecting said rotary elements effective to establish a positive drive connection between said rotary elements while said adjusting member is in a known position corresponding to the known position of said control member.

8. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated toothed member extending through said guideway and in mesh with said first rotary element and movable longitudinally in said guideway in response to movement of said adjusting member, a second rotary element coaxial with said first rotary element, an adjustable toothed coupling device connecting said rotary elements effective to establish a positive drive connection between said rotary elements while said adjusting member is in a known position corresponding to the known position of said control member, said coupling device comprising a first annular toothed surface connected to one of said rotary elements, a second annular toothed surface connected to the other of said rotary elements, said surfaces having slightly different numbers of teeth, an annular coupling member interposed between said annular toothed surfaces and having on its opposite faces teeth equal in number and shaped to interfit with the teeth on the adjacent annular tooth surface.

9. Remote control structure for moving a movable control member into an adjusted position comprising a movable adjusting member, actuating means connecting said members, a stationary housing, said actuating means comprising a peripherally toothed first rotary element mounted in said housing, a removable locator engageable between said housing and said control member to fix said control member in a known position, a passage formed in said housing shaped to cooperate with the toothed periphery of said first rotary element to define a guideway extending tangentially of said first rotary element, said actuating mechanism also comprising an elongated flexible toothed member extending through said guideway and in mesh with said first rotary element and movable longitudinally in said guideway in response to movement of said adjusting member, a flexible tubular sheath surrounding said elongated element and having one end anchored to said housing and confining said elongated element to provide for push-pull actuation of said control member through said elongated element, a second rotary element coaxial with said first rotary element, an adjustable toothed coupling device connecting said rotary elements effective to establish a positive drive connection between said rotary elements while said adjusting member is in a known position corresponding to the known position of said control member, said coupling device comprising a first annular toothed surface connected to one of said rotary elements, a second annular toothed surface connected to the other of said rotary elements, said surfaces having slightly different numbers of teeth, an annular coupling member interposed between said annular toothed surfaces and having on its opposite faces teeth equal in number and shaped to interfit with the teeth on the adjacent annular tooth surface.

10. Remote adjusting mechanism for a rotary member having a shaft, a peripherally toothed annular element mounted for rotation on said shaft, a fixed housing enclosing said element and defining an elongated guideway extending tangentially of said element, an elongated toothed element in said guideway and in mesh with said annular element and extending to a point remote from said housing for actuation thereat and movable longitudinally in said guideway to rotate said annular element, a removable locator engageable between said housing and said shaft to fix said shaft in a reference position corresponding to a known position of said rotary member, an annular coupling member located at one end of said annular element, a pair of diametrically spaced drive portions connecting said annular element and said coupling member, a driving element releasably fixed to said shaft and having a pair of diametrically extending arms, and diametrically spaced drive portions between the ends of said arms and the adjacent portions of said coupling member, each of the drive portions connecting said annular element and said coupling member being angularly separated by approximately 90 degrees from the drive portions between said coupling member and said driving element as measured about the axis of said shaft.

11. Mechanism as defined in claim 10 in which both of said drive portions comprise radially located slidably associated abutment surfaces.

12. Mechanism as defined in claim 10 in which said drive portions comprise radially extending slots and coupling projections slidably received in said slots.

(References on following page)

References Cited in the file of this patent

UNITED STATES PATENTS

| | | |
|---|---|---|
| 1,130,690 | Aufiero | Mar. 2, 1915 |
| 1,216,705 | Kryzanowsky | Feb. 20, 1917 |
| 1,559,427 | Hemphill | Oct. 27, 1925 |
| 1,795,267 | Stuart | Mar. 3, 1931 |
| 1,845,600 | Herr | Feb. 16, 1932 |
| 1,983,962 | Barber et al | Dec. 11, 1934 |
| 2,266,283 | Spengler | Dec. 16, 1941 |
| 2,594,911 | Goff | Apr. 29, 1952 |
| 2,859,630 | Hatch | Nov. 11, 1958 |

FOREIGN PATENTS

| | | |
|---|---|---|
| 403,910 | Great Britain | Jan. 4, 1934 |
| 439,726 | Great Britain | Dec. 12, 1935 |